(12) United States Patent
Ferretti

(10) Patent No.: US 10,061,140 B2
(45) Date of Patent: Aug. 28, 2018

(54) EYEGLASS FRAMES WITH DETACHABLE TEMPLE PIECES

(71) Applicant: Francesco Ferretti, Miami, FL (US)

(72) Inventor: Francesco Ferretti, Miami, FL (US)

( * ) Notice: Subject to any disclaimer, the term of this patent is extended or adjusted under 35 U.S.C. 154(b) by 0 days.

(21) Appl. No.: 15/423,493

(22) Filed: Feb. 2, 2017

(65) Prior Publication Data

US 2018/0217399 A1   Aug. 2, 2018

(51) Int. Cl.
| | |
|---|---|
| *G02C 5/14* | (2006.01) |
| *G02C 5/02* | (2006.01) |
| *G02C 5/22* | (2006.01) |
| *G02C 11/02* | (2006.01) |

(52) U.S. Cl.
CPC ............... *G02C 5/146* (2013.01); *G02C 5/02* (2013.01); *G02C 5/2209* (2013.01); *G02C 11/02* (2013.01); *G02C 2200/08* (2013.01)

(58) Field of Classification Search
CPC .......... G02C 5/16; G02C 5/22; G02C 5/2209; G02C 5/006; G02C 5/06; G02C 5/14; G02C 5/2218
USPC ................ 351/116, 111, 153, 140, 124, 130; 16/228
See application file for complete search history.

(56) References Cited

U.S. PATENT DOCUMENTS

| | | | |
|---|---|---|---|
| 1,438,532 A | 12/1922 | Kelly | |
| 1,521,484 A | 12/1924 | Stevens | |
| 3,758,203 A * | 9/1973 | Lipchik | G02C 1/08 351/130 |
| 3,801,189 A * | 4/1974 | Bolle | G02C 1/08 351/129 |
| 4,153,347 A | 5/1979 | Myer | |
| 5,418,581 A | 5/1995 | Conway | |
| 7,264,349 B1 | 9/2007 | Ku | |
| 2013/0003012 A1 | 1/2013 | Tsai | |
| 2013/0169922 A1 | 7/2013 | Austin | |
| 2016/0004094 A1* | 1/2016 | Wu | G02C 5/146 351/116 |
| 2016/0178930 A1 | 6/2016 | Drew et al. | |

FOREIGN PATENT DOCUMENTS

JP    2006-171555 A    6/2006

\* cited by examiner

*Primary Examiner* — Hung Dang
(74) *Attorney, Agent, or Firm* — Richard C. Litman

(57) ABSTRACT

The eyeglass frames with detachable temple pieces are similar in form and function to conventional eyeglass frames, but are configured to enable one or more temple pieces or components to be removably attached to the eyewear frame, and further to be interchanged with other detachable temple pieces as desired. This interchangeability permits a user to change the temple piece in the event of breakage, or for purposes of changing the style and appearance of the eyeglass frame. The eyeglass frames with detachable temple pieces include a front eyewear frame having a pair of opposed side ends and a pair of temple pieces respectively, releasably and pivotally secured to the side ends of the front eyewear frame. A bridge cover is preferably provided for releasably covering a bridge of the front eyewear frame.

14 Claims, 6 Drawing Sheets

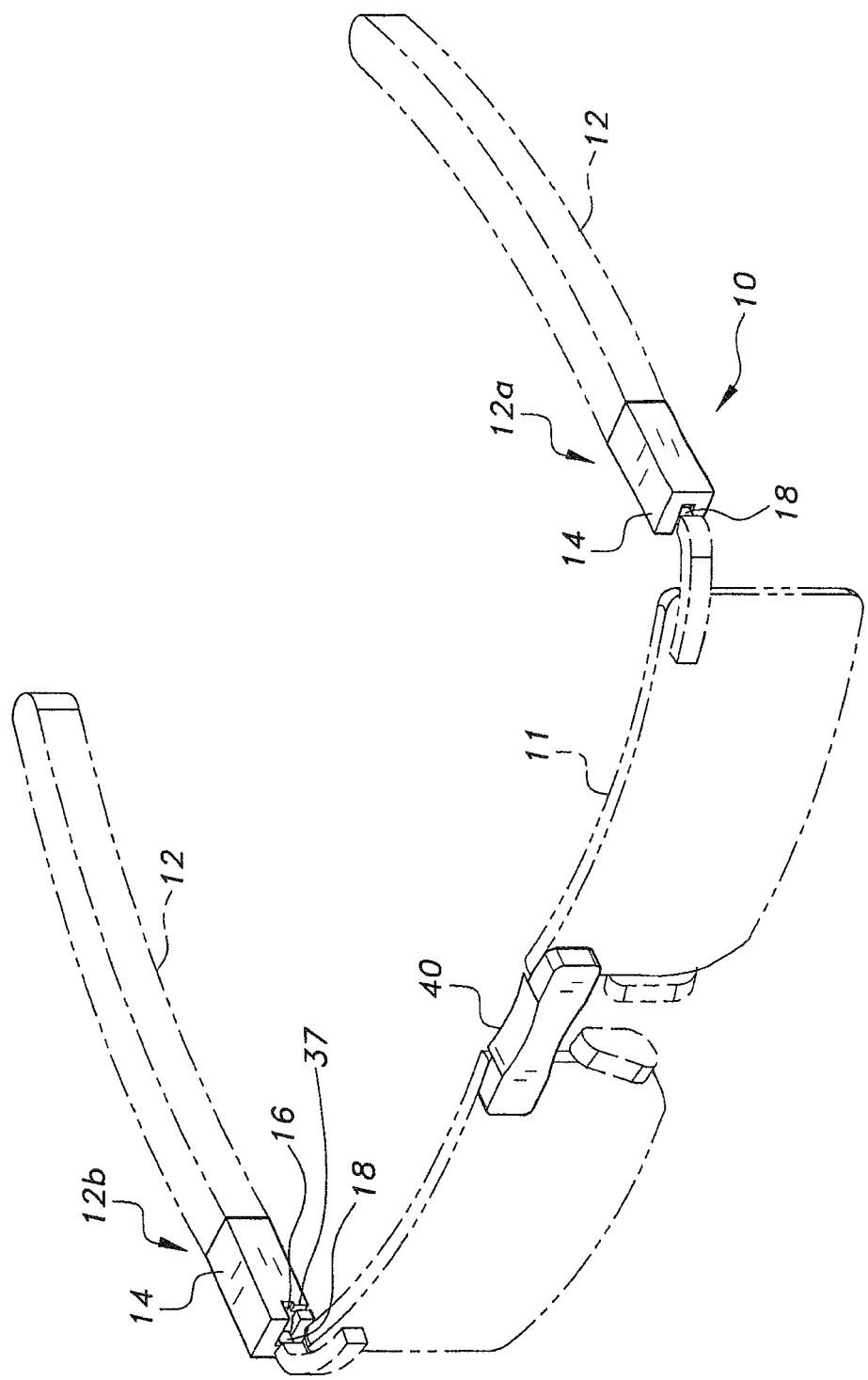

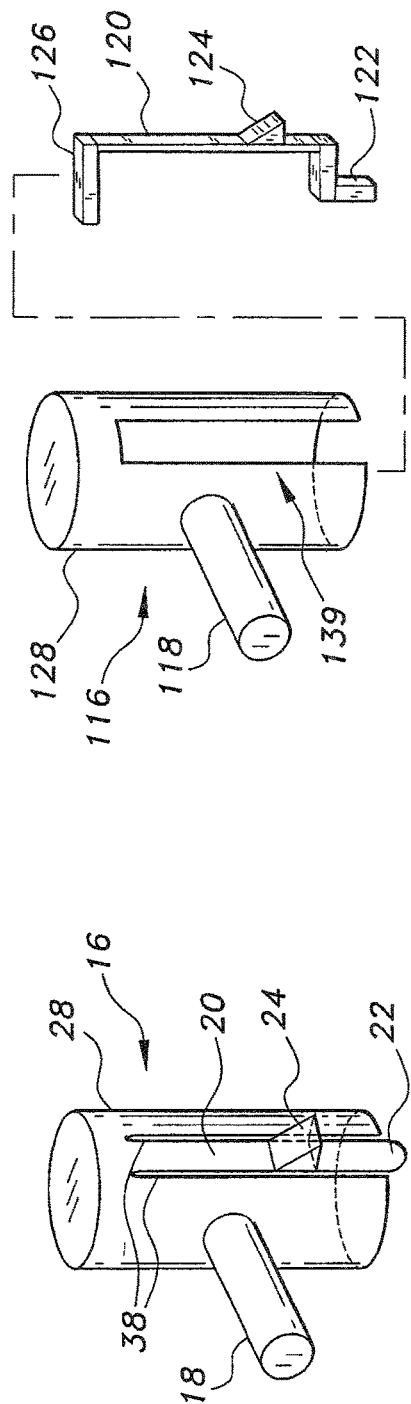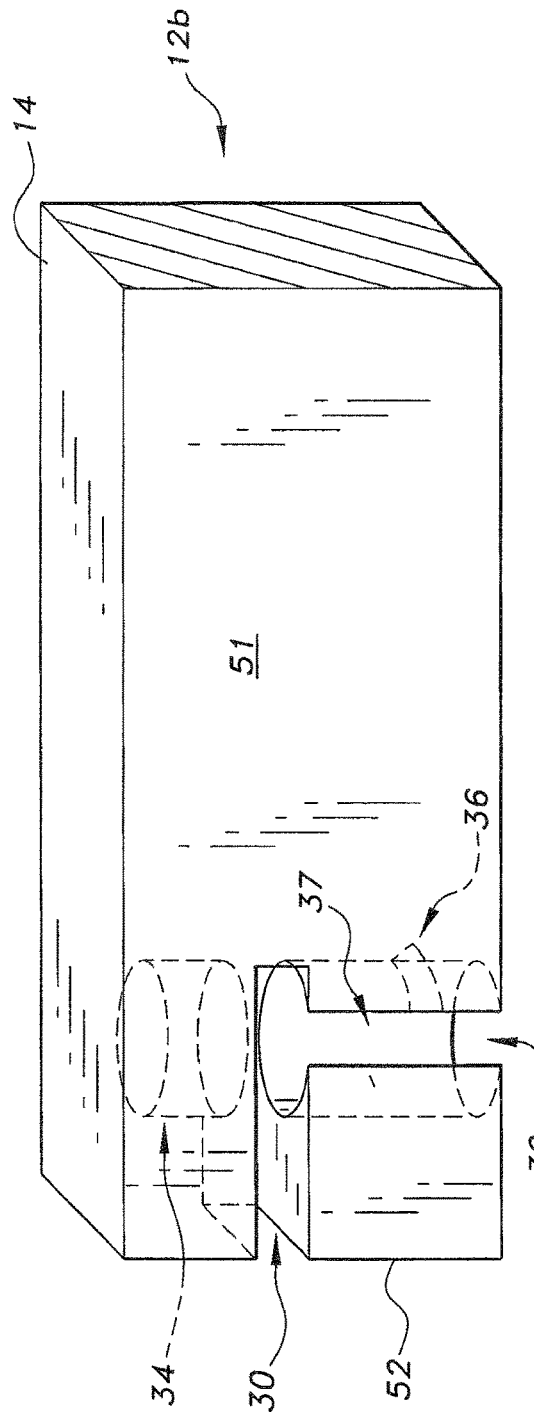

EYEGLASS FRAMES WITH DETACHABLE TEMPLE PIECES

BACKGROUND OF THE INVENTION

1. Field of the Invention

The present invention relates to eyewear, and particularly to an eyewear frame assembly with a interchangeable temple connection assembly and a detachable bridge cover assembly for customization and replacement of eyeglass temples.

2. Description of the Related Art

Eyewear provides multiple functions for a user. Not only does eyewear function as an aid to assist the user with individual vision related needs, such as enhancing vision or blocking sunlight, eyewear has also become a fashion accessory. Most current eyewear frames generally include a singular unit having a series of semi-permanently attached parts, which are not generally easy to access and/or replace by the user. In general, the eyewear lenses are the most expensive part of the eyewear. Purchasing multiple pairs of eyewear to achieve an assortment thereof can be costly. For example, a user who wishes to have different styles of eyewear is required to purchase multiple pairs of eyewear, including multiple sets of lenses. The ability to change the style of eyewear without purchasing multiple sets of lenses is desirable. Thus, eyeglass frames with interchangeable temple pieces solving the aforementioned problems is desired.

SUMMARY OF THE INVENTION

The eyeglass frames with detachable temple pieces are similar in form and function to conventional eyeglass frames, but are configured to enable one or more temple pieces or components to be removably attached to the eyewear frame, and further to be interchanged as desired. This interchangeability permits a user to change the temple piece in the event of breakage, or for purposes of changing the style and appearance of the eyeglass frame. The eyeglass frames with detachable temple pieces include a front eyewear frame having a pair of opposed side ends and a pair of temple pieces respectively, releasably and pivotally secured to the pair of opposed side ends of the front eyewear frame. The temple pieces may separately connect to further detachable temples for the eyeglasses, or may be integrally formed therewith.

Each temple piece has a first recess formed therein, with the first recess extending along a first axis, along with a slot formed through an interior wall of each temple piece. The slot is in open communication with the first recess. A second recess is further formed in each temple piece, with the second recess extending along a second axis which is orthogonal to the first axis. The second recess is in open communication with the first recess and the slot.

A pair of snap-fit locking members are provided for respectively, releasably and pivotally securing the pair of temple pieces to the pair of opposed side ends of the front eyewear frame. Each snap-fit locking member has a housing configured for removable sliding reception within a corresponding one of the first recesses and a connecting member projecting outwardly from the housing. The connecting member is slidable through a corresponding one of the slots, and is also rotatable within a corresponding one of the second recesses. The connecting member is adapted for engaging a corresponding one of the side ends of the front eyewear frame.

Each snap-fit locking member includes an abutment for elastically and releasably engaging a locking groove formed within each of the temple pieces, adjacent to, and in communication with, the first recess thereof. The housing of each snap-fit locking member may have a pair of axially-extending slots formed therethrough, such that a snap-fit locking tab is defined therebetween, with the abutment being mounted on the snap-fit locking tab. In an alternative embodiment, the housing of each snap-fit locking member is hollow and has an axially-extending slot formed therethrough. A separate snap-fit locking tab is received within the housing, with the abutment being mounted on the snap-fit locking tab and projecting through the axially-extending slot. A bridge cover is preferably provided for releasably covering a bridge of the front eyewear frame.

In another alternative embodiment, each snap-fit locking member includes a cylindrical member having opposed upper and lower ends. The upper end thereof is fixedly secured to a corresponding one of the temple pieces such that the cylindrical member is positioned within the first recess thereof and extends along the first axis. Each snap-fit locking member further includes a rod securing the lower end of the cylindrical member to the corresponding one of the temple pieces. A housing is also provided for removable sliding reception of the cylindrical member. The housing has an axial slot formed therethrough such that the rod may slide therethrough. A connecting member projects outwardly from the housing, with the connecting member being slidable through the slot formed through the interior wall of the corresponding one of the temple pieces, and also being rotatable within a corresponding one of the second recesses. The connecting member is adapted for engaging a corresponding one of the side ends of the front eyewear frame.

In a further alternative embodiment, each snap-fit locking member includes a cylindrical member having opposed upper and lower ends. The upper end thereof has a first diameter and is fixedly secured to a corresponding one of the temple pieces such that the cylindrical member is positioned within the first recess thereof and extends along the first axis. The lower end has a second diameter greater than the first diameter. A housing is configured for removable sliding reception of the cylindrical member. The housing is substantially elastic and has an axial slot formed therethrough. A gripping tab is secured to the housing adjacent the axial slot for adjustment of an internal diameter of the housing. In this way, the internal diameter of the housing can be increased to accommodate the increased diameter lower end of the cylindrical member, and then be decreased to mount the housing on the cylindrical member. A connecting member projects outwardly from the housing, with the connecting member being slidable through the slot formed through the interior wall of the corresponding one of the temple pieces, and being rotatable within a corresponding one of the second recesses. The connecting member is adapted for engaging a corresponding one of the side ends of the front eyewear frame.

These and other features of the present invention will become readily apparent upon further review of the following specification and drawings.

BRIEF DESCRIPTION OF THE DRAWINGS

FIG. 1 is a perspective view of eyeglass frames with detachable temple pieces according to the present invention.

FIG. 2A is a perspective view of a snap-fit locking member of the eyeglass frames with detachable temple pieces.

FIG. 2B is a partially-exploded, perspective view of an alternative embodiment of the snap-fit locking member of the eyeglass frames with detachable temple pieces.

FIG. 3 is a perspective view of a temple piece of the eyeglass frames with detachable temple pieces.

Similar reference characters denote corresponding features consistently throughout the attached drawings.

DETAILED DESCRIPTION OF THE PREFERRED EMBODIMENTS

Figure 4:
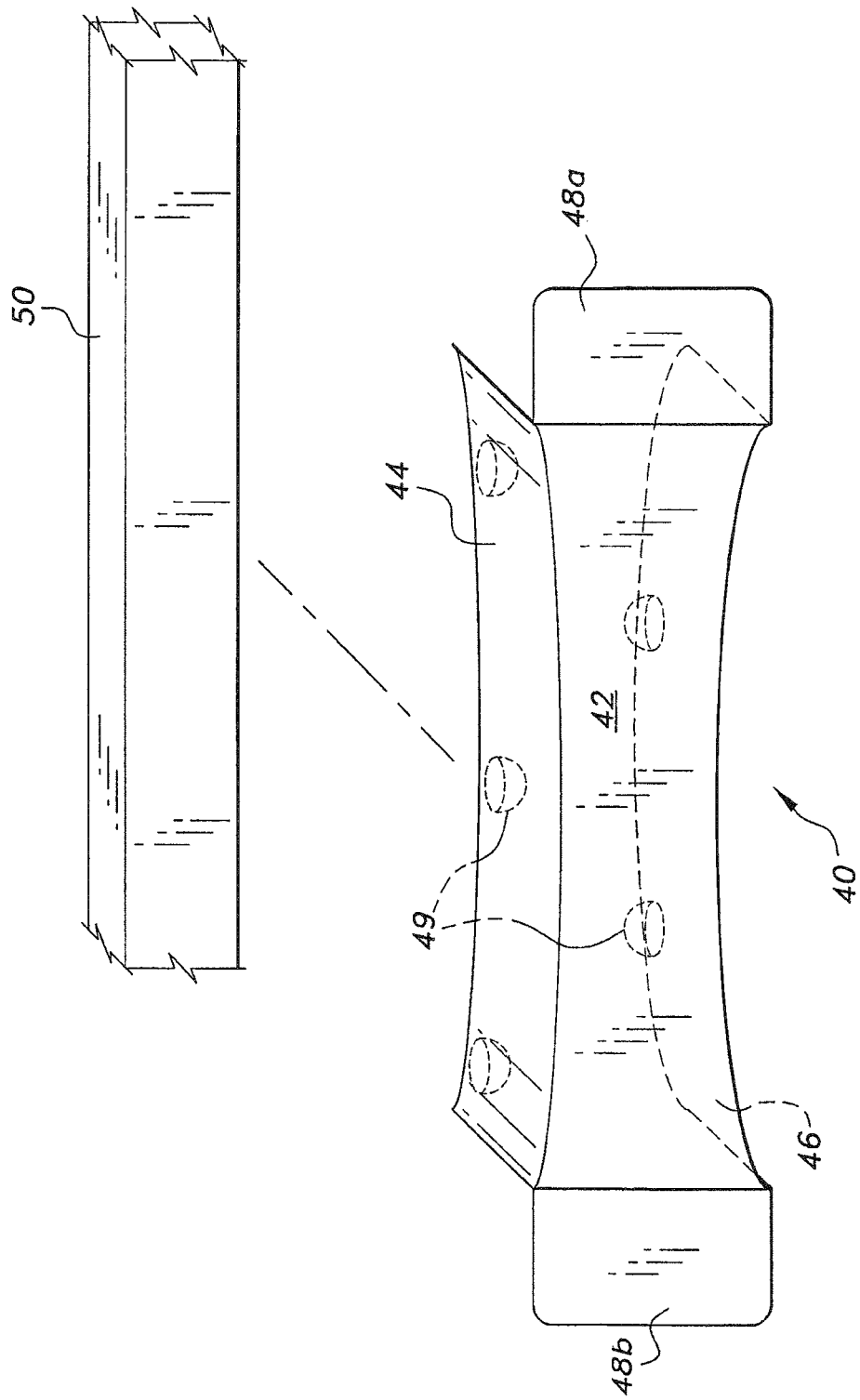
FIG. 4 is an environmental, perspective view of a detachable bridge cover of the eyeglass frames with detachable temple pieces.

The eyeglass frames with detachable temple pieces 10 are similar in form and function to conventional eyeglass frames, but are configured to enable one or more temple pieces or components to be removably attached to the eyewear frame, and further to be interchanged as desired. This interchangeability permits a user to change the temple piece in the event of breakage, or for purposes of changing the style and appearance of the eyeglass frame. As shown in FIG. 1, the eyeglass frames with detachable temple pieces 10 include a conventional front eyewear frame 11 with detachable temple pieces 12a and 12b being releasably secured thereto on respective opposed sides thereof.

Each temple piece 12a, 12b is removably coupled to the front eyewear frame 11, and each temple piece 12a, 12b serves as a support for a respective eyeglass temple 12, as shown. Temple pieces 12a, 12b can be either fixedly secured to their respective temples (i.e., the temple pieces 12a, 12b are either permanently secured to their respective temples or are formed integrally therewith) or may be removably attached to the front end of their respective eyeglass temple. In an embodiment, the corresponding temple piece assembly 12a, 12b is formed integrally with the end of the temple 12. A bridge cover 40 is further provided for releasably covering the bridge of the front eyewear frame 11.

As shown in FIG. 1, a pair of snap-fit locking members 16 are mounted on either end of the front eyewear frame 11 for respectively releasably securing the temple pieces 12a, 12b thereto. Each snap-fit locking member 16 provides secure engagement between the front eyewear frame 11 and the corresponding temple piece 12a, 12b while also providing pivotal motion of the same between an open position and a closed position; i.e., each snap-fit locking member 16 allows for releasable engagement with the corresponding temple piece 12a, 12b and also acts in a manner similar to the hinges found on conventional eyewear for folding and unfolding of the temples 12. As shown in FIG. 2A, each snap-fit locking member 16 includes a substantially cylindrical housing 28 and a connecting member 18, which extends radially outward from housing 28 for engaging the front eyewear frame 11. Although connecting member 18 is configured for insertion into a corresponding opening or recess formed in front eyewear frame 11, it should be understood that housing 28 may be secured to front eyewear frame 11 by any suitable type of fixture. As further seen in FIG. 2A, housing 28 has a pair of axially-extending slots 38 formed therethrough, which define a snap-fit locking tab 20 therebetween.

The snap-fit locking tab 20 has a generally flexible structure enabling the tab 20 to be flexed and/or moved relative to the housing 28 when pressure is applied to the tab 20. As shown, the snap-fit locking tab 20 has a free end 22 which extends past the bottom of the housing 28. Further, the tab 20 includes a generally triangular abutment 24 protruding from the side of the housing 28. Abutment 24 provides a surface for locking engagement with an interior indention or locking groove 36 formed in the corresponding temple piece 12a, 12b, as shown in FIG. 3. The free end 22 of snap-fit locking tab 20 is configured for receiving a depressing force from the user to selectively lock and unlock the snap-fit locking tab 20 from engagement with the corresponding temple piece 12a, 12b. The user applies a generally horizontal pressure to the snap-fit locking tab 20 in order to move the abutment 24, permitting the housing 28 and abutment 24 to be slid within passage 32 formed through the corresponding temple piece 12a, 12b.

In the alternative embodiment of FIG. 2B, an alternative snap-fit locking member 116 is similar to snap-fit locking member 16 of FIG. 2A, including a substantially cylindrical housing 128 and a connecting member 118, which extends radially outward from housing 128 for engaging the front eyewear frame 11. However, the alternative snap-fit locking member 116 includes a separate snap-fit locking tab 120 configured for operative engagement with housing 128. Housing 128 is hollow, as shown, and receives the snap-fit locking tab 120 therein.

The snap-fit locking tab 120 has an upper abutment 126 and lower tab member 122. The snap-fit locking tab 120 is received within housing 128 such that the upper abutment 126 contacts or engages the closed end of the housing 128. The snap-fit locking tab 120 can be installed in the housing 128 via robust frictional engagement, adhesives, welds, fasteners or the like. A slot 139 is formed through housing 128, as shown, and snap-fit locking tab 120 is positioned such that the triangular or wedge-shaped abutment 124 extends through the slot 139, thus extending outwardly from housing 128. As such, the abutment 124 facilitates locking engagement with the corresponding temple piece 12a, 12b. The snap-fit locking tab 120 has a first end 122 configured to receive a depressing force from the user to selectively lock and unlock the tab member 120 from engagement with the corresponding temple piece 12a, 12b.

Returning now to FIG. 3, each temple piece 12a, 12b includes a receiving portion 14. Although FIG. 3 illustrates temple piece 12b, it should be understood that temple pieces 12a and 12b operate in identical manners. The receiving portion 14 is adapted to receive the snap-fit locking member 16 (or 116) therein for locking engagement. As shown, the receiving portion 14 has a generally cylindrical shaped lower aperture 32 and an upper aperture or recess 34 formed therein to receive the snap-fit locking member 16 (or 116). A slot 37 is formed through the interior wall 51 of the receiving portion 14 and is in open communication with aperture 32. The slot 37 receives the connecting member 18 (or 118) when the snap-fit locking member 16 (or 116) is inserted into the aperture 32.

The aperture 32 has a locking indention or groove 36 formed therein to selectively receive the corresponding abutment 24 (or 124) upon slidable insertion of the snap-fit locking member 16 (or 116). As shown, the locking groove 36 preferably has a contour suitable for mating with abutment 24 (or 124). The locking groove 36 preferably spans approximately 90° of circumferential arc to enable sliding engagement of the abutment 24 (or 124) within locking groove 36. The receiving portion 14 further includes a cut-out or slot 30 formed horizontally and extending from the first end 52 of the receiving portion 14 to intersect with the apertures 32, 34. The slot 30 is adapted to receive the connecting member 18 (or 118). Once the snap-fit locking member 16 is rotated within the receiving portion 14, the connecting member 18 (or 118) is permitted to slidably move into the slot 30.

In operation, to unlock the temple pieces 12a, 12b from the front eyewear frame 11, the temple piece 12a, 12b is moved into a generally parallel position relative to the front eyewear frame 11 and the lenses. The snap-fit locking member 16 is positioned such that the connecting member 18 (118) is aligned with the slot 37. The user applies pressure to the tab 22 (122), thus unlocking the abutment 24 (124) from the groove 36. The disengagement of the abutment 24 (124) from the groove 36 permits rotatable movement of the housing 28 (128) within the aperture 32. At this point, the temple piece 12a, 12b can be separated from the front eyewear frame 11. The snap-fit locking member 16 (116) slides within the aperture 32 and the connecting member 18 (118) passes vertically along slot 37, releasing the temple piece assembly 12a, 12b.

Connection of the temple pieces 12a, 12b to the front eyewear frame 11 is achieved by positioning the corresponding temple 12 into a generally parallel position relative to the front eyewear frame 11. The housing 28 (128) of the snap-fit locking member 16 (116) is slid into the aperture 32 with the connecting member 18 (118) in alignment with channel 37, permitting slidable engagement. The temple piece 12a, 12b can be pushed downward toward the front eyewear frame 11, or moved relative to the front eyewear frame 11, thereby sliding the housing 28 (128) into the aperture 32. The user applies a force to the temple piece 12a, 12b such that the tab 22 (122) is depressed and forced inward by the inner surface of the aperture 32 acting on the abutment 24 (124). The abutment 24 (124) is depressed by the inner walls of the aperture 32 until the abutment 24 (124) reaches the groove 36. Upon reaching the groove 36, the abutment 24 (124) is received by the groove 36, locking the temple piece 12a, 12b to the snap-fit locking member 16 (116) and front eyewear frame 11. Alternatively, the user may also apply a force to the tab 22 (122) in a generally horizontal direction toward a central axis of the housing 28 (128) to depress the tab 22 (122).

Figure 5:
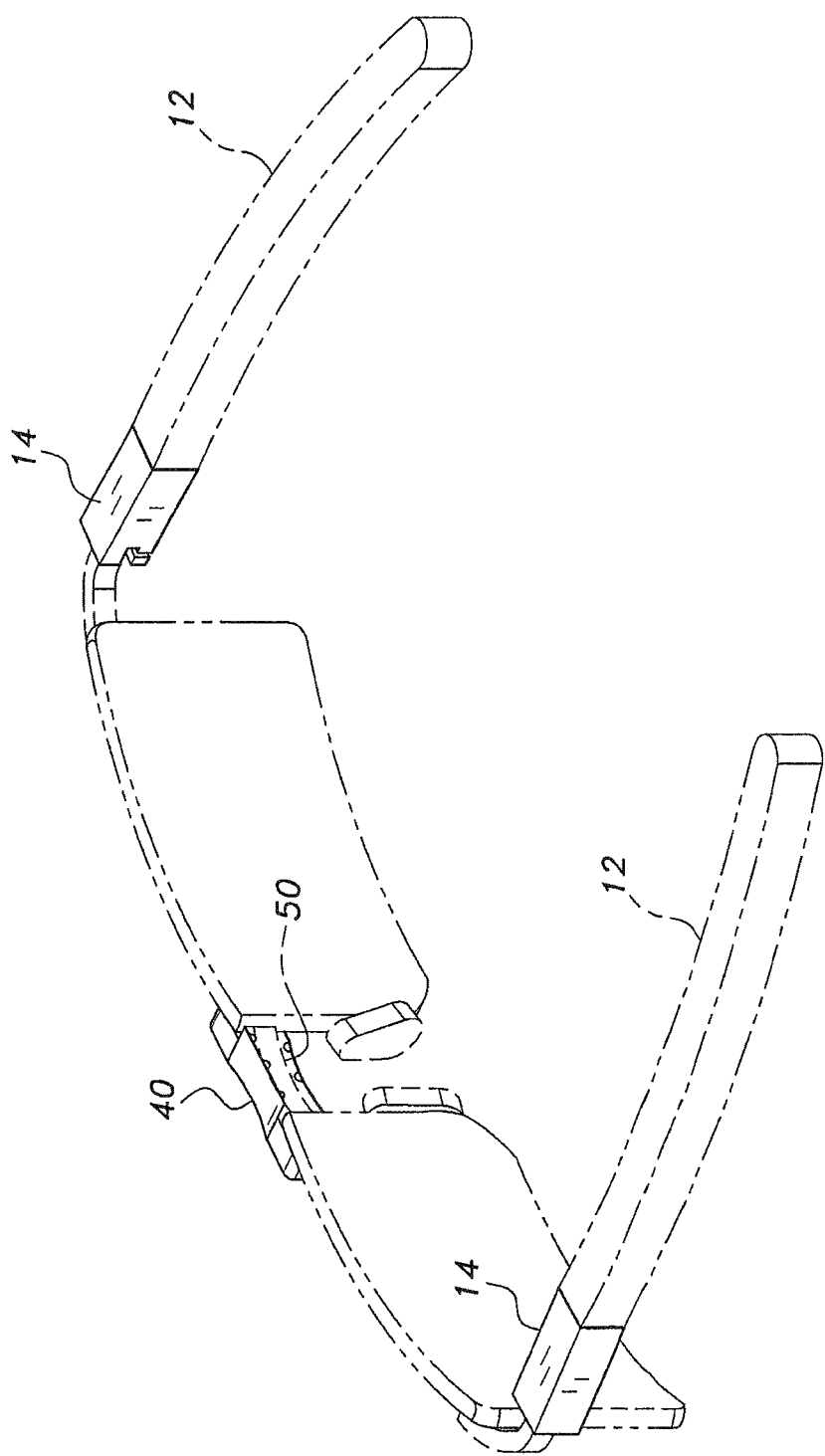
FIG. 5 is a perspective view of eyeglass frames with detachable temple pieces according to the present invention.

As noted above, a detachable bridge cover 40 is also provided for removable covering of a conventional eyewear frame bridge 50 of the front eyewear frame 11. As shown in FIGS. 4 and 5, the bridge cover 40 includes a front portion 42, an upper portion 44 and a lower portion 46. As shown, the detachable bridge cover 40 is adapted to engage a standard bridge 50 provided on a set of eyeglasses. The bridge cover 40 has a longitudinal dimension substantially similar to that of the frame bridge 50. The upper portion 44 and the lower portion 46 are preferably relatively flexible. Further, the bridge cover 40 includes respective side portions 48a, 48b on the outer ends for the front portion 42, as shown. The bridge cover 40 is configured for a removable snap-fit connection to the bridge 50. Inner grips 49 may be provided to engage the bridge 50, creating the snap-fit connection, as shown in FIG. 5.

Figure 6:
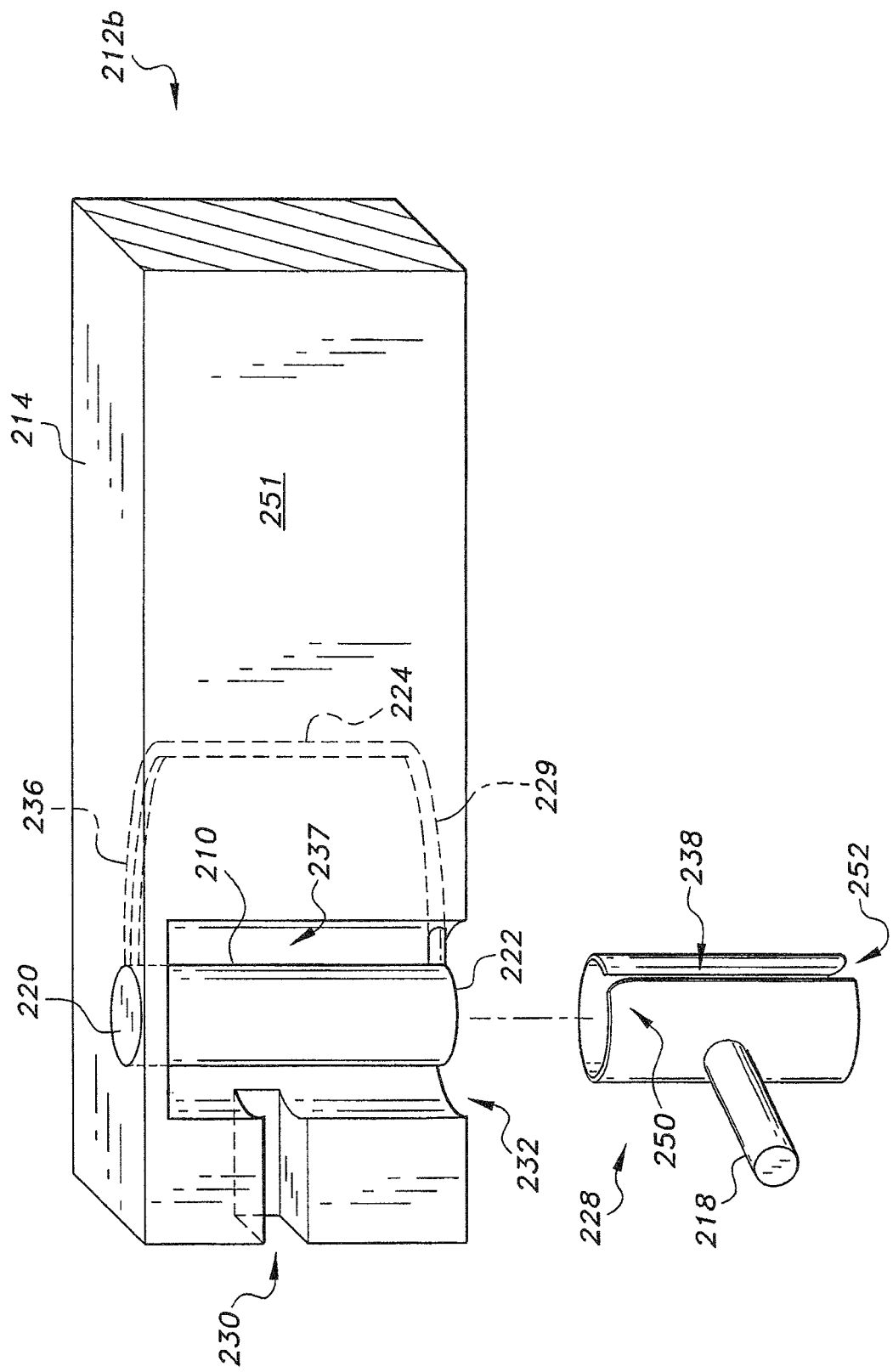
FIG. 6 is a perspective view of a temple piece and snap-fit locking member of an alternative embodiment of the eyeglass frames with detachable temple pieces according to the present invention.

In the alternative embodiment of FIG. 6, a temple portion 212b, similar to the temple portion 12b of the previous embodiments, includes receiving portion 214 and an alternative snap-fit locking member having a cylindrical member 210, a housing 228, and a connecting member 218. The cylindrical member 210 has opposed upper and lower ends 220, 222, respectively. The upper end 220 is fixedly secured to the corresponding one of the temple pieces 212b such that the cylindrical member 210 is positioned within the first recess 232 and extends along a first axis, as shown. A U-shaped wire or support 224 may be partially embedded in the temple portion 212b, such that an embedded upper arm 236 provides support for the upper end 220 of cylindrical member 210, and a lower arm thereof forms a rod 229, partially projecting into first recess 232, for securing the lower end 222 of the cylindrical member 210 to the corresponding one of the temple pieces 212b.

The housing 228 is provided for removable sliding reception of the cylindrical member 210. The housing 228 is substantially elastic, e.g., forming from a flexible metal or memory metal. In order to effect efficient sliding and rotation of housing 228 with respect to cylindrical member 210, the housing 228 is preferably formed as a cylindrical shell, as shown. The housing 228 has an axial slot 238 formed therethrough such that the rod 229 may slide therethrough when housing 228 is slid onto and about cylindrical member 210. A connecting member 218 projects outwardly from the housing 228. The housing 228 can be slid into the first recess 232, e.g., starting from a lower end of the first recess 232 and moving upwards into the first recess 232 until the bottom end of the housing 228 passes the rod 229. The housing 228 can then be rotated within the first recess 232 to permit the connecting member 218 to slide into the second recess 230, similar to operation of connecting members 18 and 118 in the previous embodiments. The connecting member 218 is adapted for engaging a corresponding one of the side ends of the front eyewear frame 11.

The first recess 232 and slot 237 extends along a first access. The second recess 230 extends along a second axis, orthogonal to the first axis, and is in open communication with first recess 232 and slot 237. As shown, an upper edge 250 of the housing 228, adjacent upper end of slot 238, and a lower edge 252 of housing 228, adjacent lower end of slot 238, may be angled or curved, allowing rod 229 to easily slide into the slot 238. The slot 238 may have a width slightly less than the diameter of rod 229, allowing the slot 238 to elastically expand when pressed against rod 229 as the rod 229 is being slid therethrough.

Figure 7:
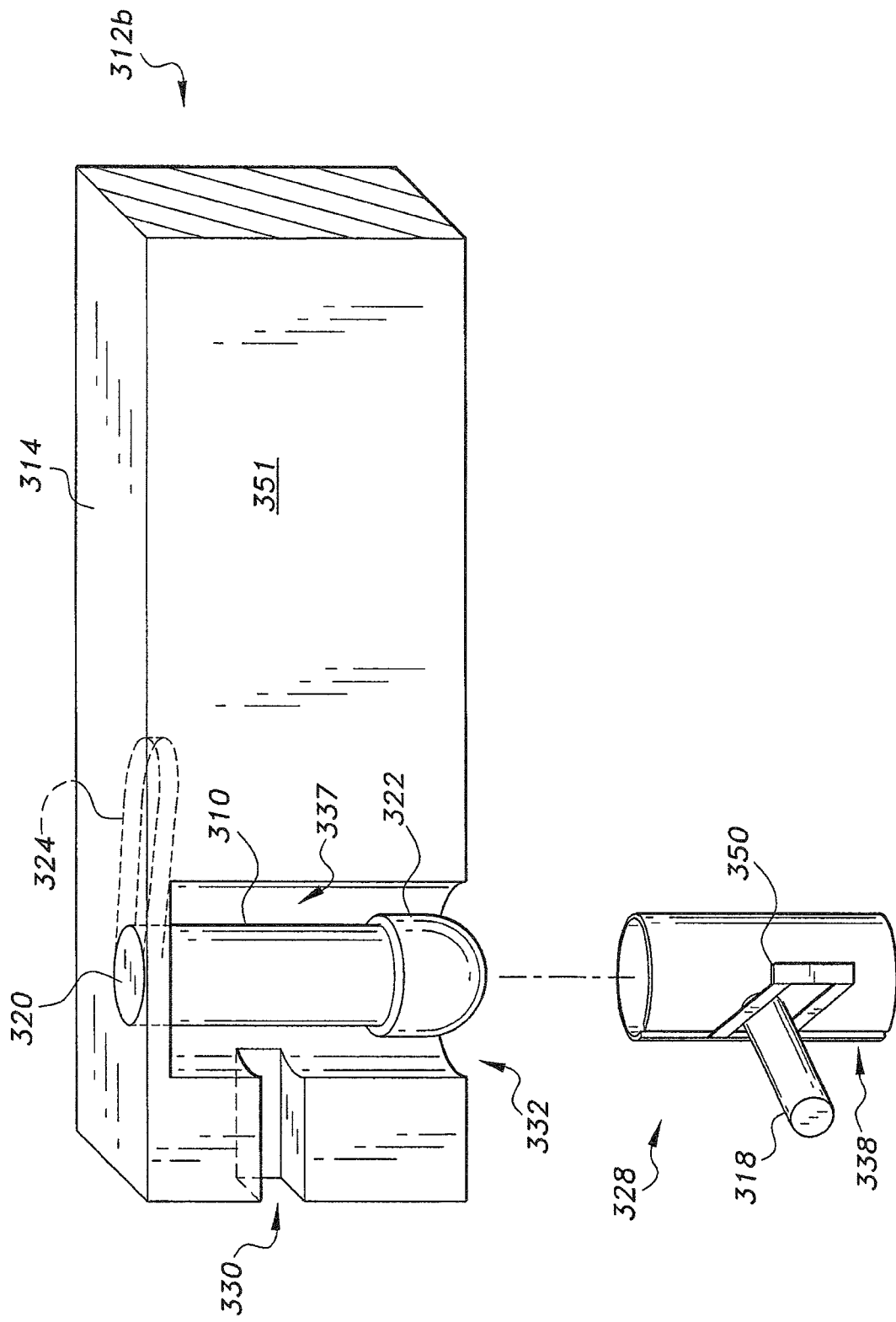
FIG. 7 is a perspective view of a temple piece and snap-fit locking member of another alternative embodiment of the eyeglass frames with detachable temple pieces according to the present invention.

In the further alternative embodiment of FIG. 7, a temple portion 312b, similar to the temple portion 12b of the previous embodiments, includes receiving portion 314 and an alternative snap-fit locking member having a cylindrical member 310, a housing 328, and a connecting member 318. The cylindrical member 310 has opposed upper and lower ends 320, 322, respectively. The upper end 320 has a first diameter and is fixedly secured to the corresponding one of the temple pieces 312b such that the cylindrical member 310 is positioned within the first recess 332 and extends along the first axis, as shown. The lower end 322 has a second diameter greater than the first diameter.

The housing 328 is configured for removable sliding reception of the cylindrical member 310. The housing 328 is substantially elastic, e.g., formed from a flexible metal or memory metal. The housing 328 has an axial slot 338 formed therethrough. A gripping tab 350 is secured to the housing 328 adjacent the axial slot 338 for adjustment of an internal diameter of the housing 328, e.g., widen the axial slot 338 when removing the housing 328 from the cylindrical member 310. In this way, the internal diameter of the housing 328 can be increased to accommodate the increased diameter lower end 322 of the cylindrical member 310, when removing the housing from and/or mounting the housing 328 on the cylindrical member 310.

As shown, additional wire reinforcement 324 or the like may be embedded within the temple portion 312b and secured to the upper end 320 of cylindrical member 310. A connecting member 318 projects outwardly from the housing 328. The housing 328 can be slid into the first recess 332, e.g., starting from a lower end of the first recess 332 and moving upwards into the first recess 332 until the bottom end of the housing 328 passes the increased diameter lower end 322 of the cylindrical member 310. The housing 328 can then be rotated within the first recess 332 to permit the connecting member 318 to slide into the second recess 330. The connecting member 318 is adapted for engaging a corresponding one of the side ends of the front eyewear frame 11. As in the previous embodiments, slot 337 is in open communication with first recess 332 and extends along the first axis. The second recess 330 extends along a second axis, orthogonal to the first axis, and is in open communication with first recess 332 and slot 337.

It is to be understood that the present invention is not limited to the embodiments described above, but encompasses any and all embodiments within the scope of the following claims.

I claim:

1. An eyeglass frame with detachable temple pieces, comprising:
    a front eyewear frame having a pair of opposed side ends;
    a pair of temple pieces respectively, releasably, and pivotally secured to the pair of opposed side ends of said front eyewear frame, wherein each said temple piece has a first recess formed therein, the first recess extending along a first axis, a second recess further being formed in each said temple piece, the second recess extending along a second axis which is orthogonal to the first axis, the second recess being in open communication with the first recess and a locking groove formed within each of the temple pieces, adjacent to, and in communication with, the first recess thereof; and
    a pair of snap-fit locking members for respectively, releasably and pivotally securing the pair of temple pieces to the pair of opposed side ends of the front eyewear frame, wherein each said snap-fit locking member has a housing configured for removable insertion within a corresponding one of the first recesses and a connecting member projecting outwardly from the housing, the connecting member being adapted for selectively extending through the second recess and engaging a corresponding one of the side ends of the front eyewear frame, further wherein each said snap-fit locking member includes an abutment for elastically and releasably engaging the locking groove formed within each of the temple pieces.

2. The eyeglass frame with detachable temple pieces as recited in claim 1, wherein the housing of each said snap-fit locking member has a pair of axially-extending slots formed therethrough, a snap-fit locking tab being defined therebetween, the abutment being mounted on the snap-fit locking tab.

3. The eyeglass frame with detachable temple pieces as recited in claim 1, wherein the housing of each said snap-fit locking member is hollow and has an axially-extending slot formed therethrough, a snap-fit locking tab being received within the housing, the abutment being mounted on the snap-fit locking tab and projecting through the axially-extending slot.

4. The eyeglass frame with detachable temple pieces as recited in claim 1, further comprising a bridge cover for releasably covering a bridge of the front eyewear frame.

5. The eyeglass frame with detachable temple pieces as recited in claim 4, wherein the bridge cover has a substantially U-shaped cross-sectional contour and includes an upper portion, a lower portion and a front portion.

6. The eyeglass frame with detachable temple pieces as recited in claim 5, further comprising a plurality of engaging members formed on an interior surface of the bridge cover for releasably engaging the bridge of the front eyewear frame.

7. An eyeglass frame with detachable temple pieces, comprising:
    a front eyewear frame having a pair of opposed side ends;
    a pair of temple pieces respectively, releasably and pivotally secured to the pair of opposed side ends of said front eyewear frame, wherein each said temple piece has a first recess formed therein, the first recess extending along a first axis, and a second recess further being formed in each said temple piece, the second recess extending along a second axis which is orthogonal to the first axis, the second recess being in open communication with the first recess; and
    a pair of snap-fit locking members for respectively, releasably and pivotally securing the pair of temple pieces to the pair of opposed side ends of the front eyewear frame, wherein each said snap-fit locking member comprises:
        a cylindrical member having opposed upper and lower ends, the upper end thereof being fixedly secured to a corresponding one of the temple pieces such that the cylindrical member is positioned within the first recess thereof and extends along the first axis;
        a rod securing the lower end of the cylindrical member to the corresponding one of the temple pieces;
        a housing configured for removable sliding reception of the cylindrical member, the housing having an axial slot formed therethrough such that the rod may slide therethrough; and
        a connecting member projecting outwardly from the housing, the connecting member being adapted for selectively extending through the second recess and engaging a corresponding one of the side ends of the front eyewear frame.

8. The eyeglass frame with detachable temple pieces as recited in claim 7, further comprising a bridge cover for releasably covering a bridge of the front eyewear frame.

9. The eyeglass frame with detachable temple pieces as recited in claim 8, wherein the bridge cover has a substantially U-shaped cross-sectional contour and includes an upper portion, a lower portion and a front portion.

10. The eyeglass frame with detachable temple pieces as recited in claim 9, further comprising a plurality of engaging members formed on an interior surface of the bridge cover for releasably engaging the bride of the front eyewear frame.

11. An eyeglass frame with detachable temple pieces, comprising:
    a front eyewear frame having a pair of opposed side ends;
    a pair of temple pieces respectively, releasably, and pivotally secured to the pair of opposed side ends of said front eyewear frame, wherein each said temple piece has a first recess formed therein, the first recess extending along a first axis, and a second recess further being formed in each said temple piece, the second recess extending along a second axis which is orthogonal to the first axis, the second recess being in open communication with the first recess and the slot; and a pair of snap-fit locking members for respectively, releasably and pivotally securing the pair of temple pieces to the pair of opposed side ends of the front eyewear frame, wherein each said snap-fit locking member comprises:

a cylindrical member having opposed upper and lower ends, the upper end thereof having a first diameter and being fixedly secured to a corresponding one of the temple pieces such that the cylindrical member is positioned within the first recess thereof and extends along the first axis, the lower end having a second diameter greater than the first diameter;

a housing configured for removable sliding reception of the cylindrical member, the housing having an axial slot formed therethrough, a gripping tab being secured to the housing adjacent the axial slot for adjustment of an internal diameter of the housing; and a connecting member projecting outwardly from the housing, the connecting member being adapted for selectively engaging a corresponding one of the side ends of the front eyewear frame.

12. The eyeglass frame with detachable temple pieces as recited in claim 11, further comprising a bridge cover for releasably covering a bridge of the front eyewear frame.

13. The eyeglass frame with detachable temple pieces as recited in claim 12, wherein the bridge cover has a substantially U-shaped cross-sectional contour and includes an upper portion, a lower portion and a front portion.

14. The eyeglass frame with detachable temple pieces as recited in claim 13, further comprising a plurality of engaging members formed on an interior surface of the bridge cover for releasably engaging the bride of the front eyewear frame.

* * * * *